United States Patent [19]

Gosnell et al.

[11] Patent Number: 5,411,355
[45] Date of Patent: May 2, 1995

[54] UTILITY VEHICLE BED PARTITION

[76] Inventors: Raymond H. Gosnell, 47526 Clipper Dr., Plymoth Twp., Wayne County, Mich. 48170; Daniel A. Cannon, 12787 Catalpa, Southgate, Mich. 48195

[21] Appl. No.: 95,572

[22] Filed: Jul. 19, 1993

[51] Int. Cl.6 .................. B61D 45/00; B60P 7/00
[52] U.S. Cl. ................................ 410/139; 220/542
[58] Field of Search .......... 410/129, 130, 132, 135, 410/137, 138, 139, 143, 144, 145, 149, 150, 152; 220/529, 534, 541, 542, 544, 545, 546, 549, 550; 296/37.6, 39.2

[56] References Cited

U.S. PATENT DOCUMENTS

| | | | |
|---|---|---|---|
| 1,246,335 | 11/1917 | Seelinger | 220/542 |
| 2,160,870 | 6/1939 | Jones | 410/137 |
| 2,592,666 | 4/1952 | Doherty | 410/149 |
| 3,352,595 | 11/1967 | Bezlaj | 410/132 X |
| 4,256,425 | 3/1981 | Burgess et al. | 410/149 |
| 4,650,383 | 3/1987 | Hoff | 410/149 |
| 4,722,646 | 2/1988 | McIntyre | 410/138 |
| 4,772,165 | 9/1988 | Bartkus | 410/139 |
| 4,861,088 | 8/1989 | Fedrigo | 296/57.1 |
| 4,961,677 | 10/1990 | Downard, Jr. | 410/129 |
| 4,968,084 | 11/1990 | Asher et al. | 296/57.1 X |
| 5,004,287 | 4/1991 | Doyle | 296/57.1 |
| 5,104,269 | 4/1992 | Hardison | 410/149 |
| 5,314,276 | 5/1994 | Barone | 410/139 |

FOREIGN PATENT DOCUMENTS 457500 11/1936 United Kingdom .
678021 8/1952 United Kingdom .

Primary Examiner—Michael S. Huppert
Assistant Examiner—James Eller
Attorney, Agent, or Firm—Barnes, Kisselle, Raisch, Choate, Whittemore & Hulbert

[57] ABSTRACT

A bed partition arrangement for a utility vehicle such as a pickup truck in which a flat panel has laterally opposed side edges and a bottom edge. A pair of latches are disposed at the respective side edges of the panel, with each latch including a latch bar for engagement with opposed longitudinally spaced openings in a pair of rails mounted along opposed sidewalls of the vehicle bed. The latch bars are urged by coil springs laterally outwardly of the panel for releasable locking engagement with openings in the side rails, and the latch bars are movable by handles inwardly against the springs for selective positioning of the panel lengthwise of the vehicle bed. Resilient feet are carried along the bottom edge of the panel for compressive frictional engagement with the floor of the vehicle bed when the panel is mounted between the side rails to hold the panel in position and prevent the panel from swinging about the axis of the latches.

18 Claims, 2 Drawing Sheets

UTILITY VEHICLE BED PARTITION

The present invention is directed to a partition for the bed of a utility vehicle such as a pickup truck, and more particularly to a selectively movable partition for dividing the vehicle bed into two or more discrete areas.

BACKGROUND AND SUMMARY OF THE INVENTION

There are many applications in which it would be desirable to divide the bed of a utility vehicle such as a pickup truck into discrete areas of variable size. For example, when carrying packages or groceries, it would be desirable to provide a bed partition near the vehicle tailgate both to prevent the packages from sliding and spilling into the main area of the bed, and to position the packages at the gate for ease in off-loading. In the same way, when carrying cargo, it would be desirable in many instances to provide one or more partitions for separating the cargo and limiting motion of the cargo during travel.

It is therefore a general object of the present invention to provide a partition arrangement for a utility vehicle for effectively dividing or partitioning the vehicle bed into two (or more) discrete areas. A more specific object of the present invention is to provide a partition arrangement of the described character in which a partition is selectively movable and adjustable lengthwise of the vehicle bed, in which the partition may be readily adjustably positioned by persons of limited strength and dexterity, that is economical to fabricate, that may be incorporated into the vehicles as standard equipment or as an option at the time of original vehicle manufacture, or may be marketed as an accessory in the vehicle aftermarket, and/or that can accommodate vehicles having differing bed depth.

A utility vehicle bed partition arrangement in accordance with the present invention includes a pair of rails for mounting along the sidewalls of the vehicle bed, a partition having laterally opposed side edges, and a pair of latches at the respective side edges of the partition for selective releasable locking engagement with the opposing rails. The rails in the preferred embodiment of the invention have openings at uniform spacing lengthwise of each rail and disposed in laterally opposed pairs when the rails are assembled to a vehicle. The partition includes a panel having laterally outwardly opening pockets at the opposed side edges, and latch bars slidably disposed in the respective pockets. Coil springs are captured beneath the latch bar in each pocket for urging the latch bar into an opposing rail opening, and a handle is coupled to each latch bar through a slot in the panel for both moving the latch bar against the coil spring to release the panel and limiting motion of the latch bar both into and out of the pocket.

One or more feet of resilient elastomeric material are mounted along the bottom edge of the partition panel for resilient frictional engagement with the floor of the vehicle bed to restrain the panel from swinging about the axis of the latch bars. Each foot has angularly extending compressible legs that frictionally engage the bed floor when the partition panel is fastened to the side rails. The feet are removably mounted on the panel, and may be provided in different heights for adapting a single panel for vehicle beds of differing depth.

The panel in the preferred embodiment of the invention comprises a unitary twin-sheet high-density talc-filled polyethylene construction. An elongated cylindrical tube of PVC or other suitable material is insert molded between the panel sheets along the upper edge of the panel to help rigidify the panel and to form a cylindrical passage that extends entirely along the upper edge of the panel. A pair of pins are positioned adjacent to but spaced from the respective ends of the tube after or, more preferably, prior to insert-molding to provide seats for the respective springs and thereby define the respective pockets. The latch bars are of solid plastic composition, and are slidably received in the tube ends. The handles are threadably fastened to the latch bars through slots in the panel, so that the bars and springs may be readily removed for repair if needed. The side rails are of rectangular metallic tube stock.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

The drawings illustrate a partition arrangement 10 in accordance with a presently preferred embodiment of the invention used in conjunction with the bed 12 of a pickup truck 14 of generally conventional construction. It will be recognized, however, as the description unfolds that the partition arrangement 10 is by no means limited specifically to pickup trucks, but may be readily employed in conjunction with other types of utility vehicles such as sport utility vehicles, vans and mini-vans, etc.

Figure 1:
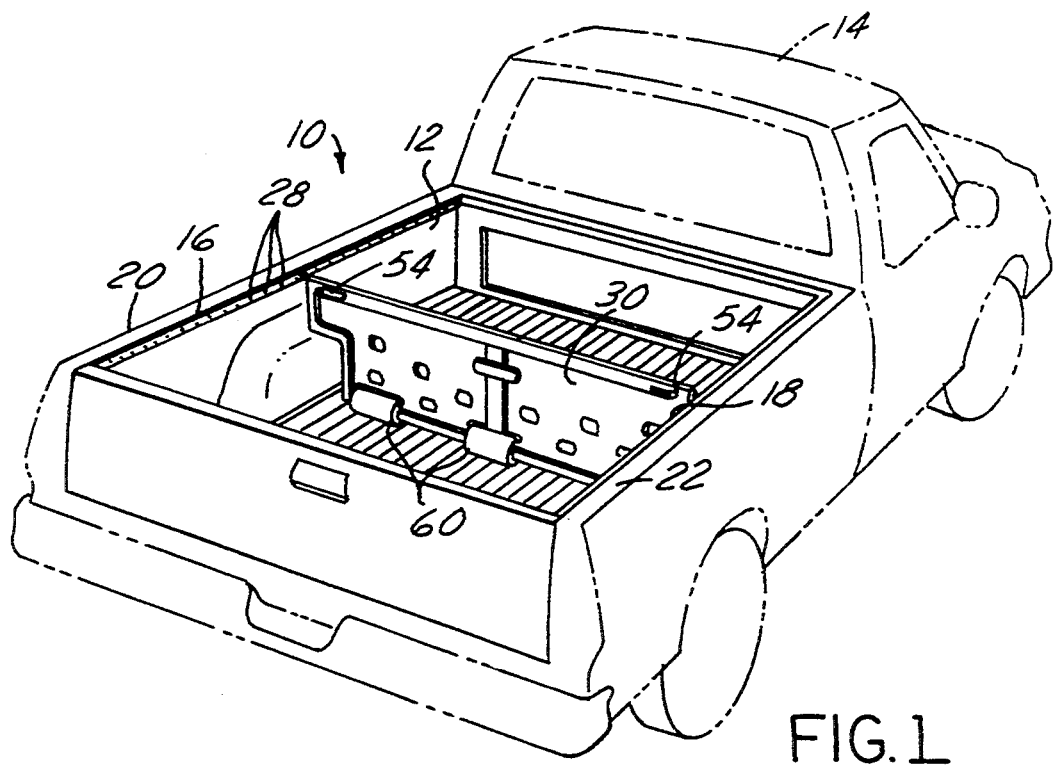
FIG. 1 is a perspective view of a partition arrangement in accordance with a presently a preferred embodiment of the invention mounted in the bed of a pickup truck.
Figure 4:
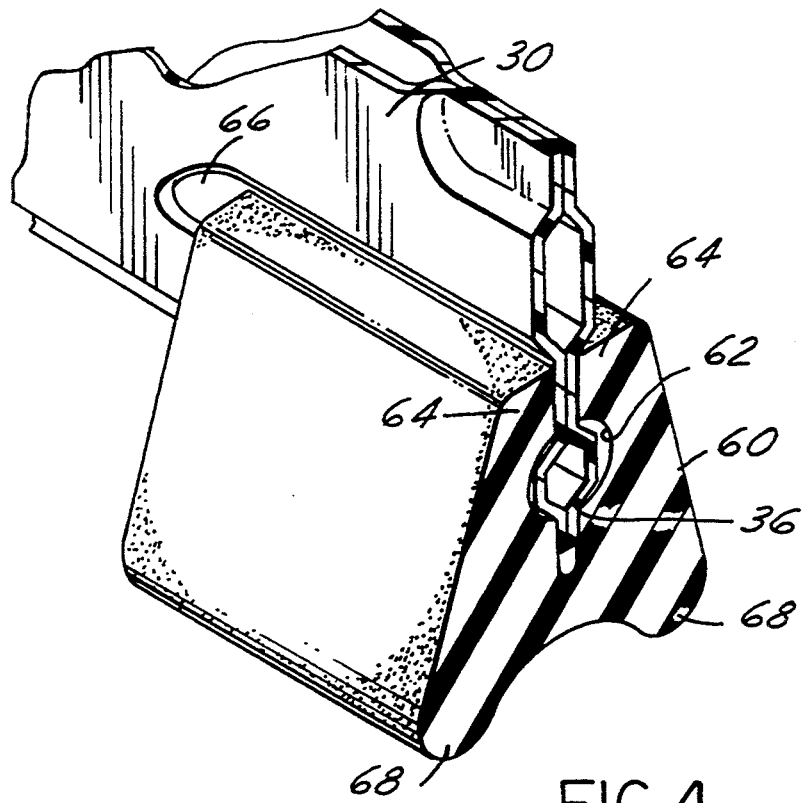
FIGS. 3, 4 and 5 are fragmentary sectional views taken substantially along the respective lines 3—3, 4—4 and 5—5 in FIG. 2.

Partition arrangement 10 includes a pair of side rails 16,18 for fastening in laterally opposed parallel positions along the sidewalls 20,22 of vehicle bed 12. Each rail 16,18 comprises a section of metallic rectangular tube stock of appropriate length fastened to the adjacent bed sidewall, preferably by double-sided tape although screws or other fasteners may be employed. Each rail 16,18 has openings 28 in one wall at uniform spacing lengthwise of the respective rails, as best seen in FIG. 1, that form opposed pairs of openings in assembly of the rails to a vehicle. In a presently preferred embodiment, openings 28 are at two-inch spacing from each other.

Figure 2:
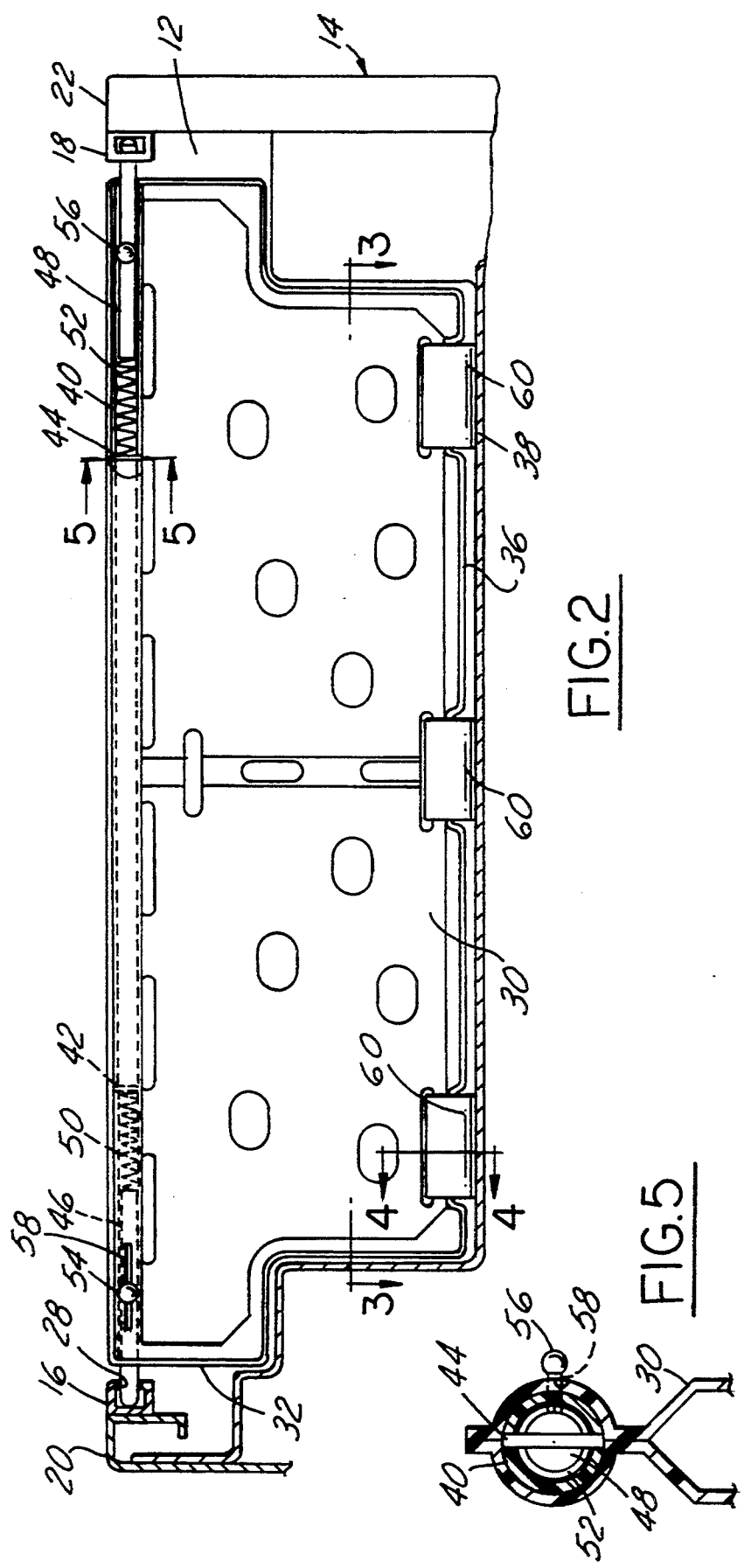
FIG. 2 is an elevational view of the bed partition arrangement illustrated in FIG. 1.
Figure 5:
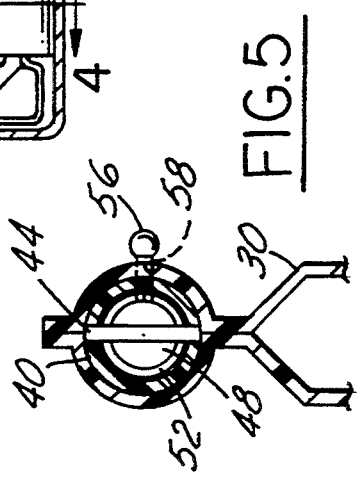
Figure 3:
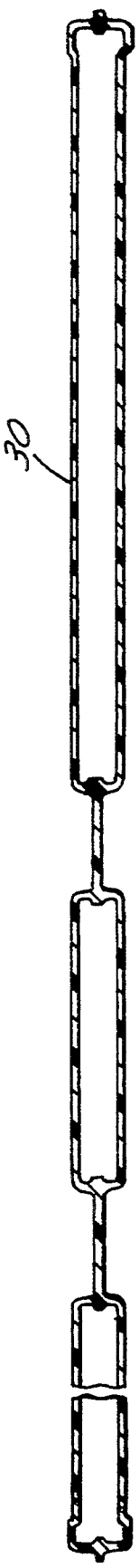

A flat panel 30 is constructed as a twin-sheet thermoform unit of high-density polyethylene or other suitable material. Panel 30 has side edges 32,34 contoured to fit between the sidewalls 20,22 of the vehicle bed, including indentations or recesses best seen in FIGS. 1 and 2 for conforming to the vehicle wheel wells. Panel 30 also has a bottom edge 36 that is disposed in assembly adjacent to the base or floor 38 of vehicle bed 12. A sleeve or tube 40 of PVC or other suitable material is insert molded between the sheets of panel 30 so as to extend laterally along the upper edge of panel 30. Tube 40 not only strengthens and rigidifies the panel, but also provides an inside diameter of precise dimension. A pair of pins 42,44 extend diametrically across tube 40 adjacent to but spaced from the side edges of the panel. Preferably, pins 42,44 are pressed into tube 40 prior to the insert-molding operation. A pair of latch bars of high-impact plastic or other suitable construction are slidably received into the opposed ends of tube 40. A pair of coil springs 50,52 are captured in compression between each latch bar 46,48 and the opposing pin 42,44.

A handle 54,56 is threadably fastened to each associated latch bar 46,48 by a stud that extends through an elongated slot 58 in the body of panel 30 and tube 40. Thus, latch bars 46,48 may be moved inwardly into panel 30 against springs 50,52 by grasping and moving handles 54,56 laterally inwardly toward each other, and the respective latch bars are moved laterally outwardly by the force of springs 50,52 when the handles are released. Slots 58 have closed inner ends that limit motion of the handles and latch bars against the springs, and closed outer ends that limit extension of the latch bars from the panel side edges.

A series of feet 60 are removably mounted along bottom edge 36 of panel 30, feet 60 being spaced from each other lengthwise of the panel. Each foot 60 is of resilient elastomeric composition such as fifty durometer rubber. A central slot 62 in each foot 60 is received over lower panel edge 36, and the foot is retained on the panel by resiliency of opposed fingers 64 received in corresponding depressions 66 in the opposed faces of the panel. A pair of legs 68 extend from the body of each foot 60 away from and at an outward angle to panel 30. The dimensions of feet 60 are coordinated with the dimensions of panel 30 and the depth of bed 12 so that legs 68 of feet 60 are compressed against the floor 38 of bed 12 when panel 30 is mounted between rails 16,18. Such resilient compression of feet 60, particularly in conjunction with the geometry of legs 68, frictionally engages floor 38 of bed 12 (or the mat or liner of bed 12), and prevents panel 30 from swinging or rocking about the axis of latch bars 46,48.

In use, side rails 16,18 are mounted to vehicle bed sidewalls 20,22 so that openings 28 are laterally aligned. Panel 30 may then be adjustably positioned within bed 12 between rails 16,18 by simply moving handles 54,56 toward each other, positioning panel 30 where desired, pushing downwardly on the panel to compress feet 60, and then releasing handles 54,56. Latch bars 46,48 are then urged by springs 50,52 outwardly into opposed aligned side rail openings 28, and panel 30 is locked in position. Such panel position may be readily varied as desired, or the panel may be removed entirely from the vehicle for access to the field bed dimension. More than one panel may be employed to partition or divide the bed into multiple sections. In the event a handle, latch bar or spring is broken in use, the same may be replaced by merely unscrewing the handle from the latch bar, and replacing the desired part.

The partition arrangement of the present invention may be readily incorporated as standard equipment or an option in vehicles at the time of original vehicle manufacture, with side rails 16,18 built into the vehicle and panel 30 specifically contoured for a given vehicle model. Alternatively, the partition arrangement of the present invention may be marketed as an aftermarket accessory, which may be readily added to a vehicle by relatively unskilled persons. The partition arrangement may be marketed as an aftermarket kit that includes a number of feet 60 of differing height to accommodate minor variations in bed depth among vehicle models and/or variations in positioning of rails 16,18. Panel 30 is preferably provided as a twin-sheet thermoform as described above, having a plurality of strengthening embossments as shown in the drawings. Such embossments may be wholly or partially open, if desired, to reduce wind resistance. The resin composition of panel 30 may be filled with talc or other suitable material for increasing material density, if desired.

We claim:

1. A bed partition arrangement for utility vehicles comprising:
   a pair of rails for mounting along opposed sidewalls of the vehicle bed, said rails having longitudinally spaced openings adapted to be disposed in laterally aligned pairs when said rails are mounted to the vehicle bed sidewalls,
   a flat panel having laterally opposed side edges and a bottom edge,
   a pair of latches disposed at said side edges of said panel, each of said latches including a latch bar and means for moving said bar into locking engagement with an opposed opening in one of said rails, and
   at least one foot of resilient elastomeric construction mounted at said bottom edge of said panel for frictional engagement with the floor of the vehicle bed to restrain motion of said panel when said latches are in locking engagement with said rails.

2. The arrangement set forth in claim 1 wherein said panel side edges are contoured for receipt between the vehicle bed sidewalls and floor.

3. The arrangement set forth in claim 2 wherein said panel is of twin-sheet thermoform resin composition.

4. The arrangement set forth in claim 1 wherein said latches comprise a pair of coaxial laterally outwardly opening pockets at respective ones of said side edges of said panel slidably receiving respective ones of said latch bars, a pair of coil springs disposed in respective ones of said pockets beneath said latch bars, and means for urging said latch bars into said pockets against said springs for alignment with an opening in one of said rails and then releasing said latch bar for engagement with the opening under force of said spring.

5. The arrangement set forth in claim 4 wherein said urging means comprises a slot opening through said panel into each said pocket, and a handle coupled to each said bar and extending through the corresponding slot, said slot cooperating with said handle for limiting motion of the corresponding latch bar both into and out of the corresponding pocket.

6. The arrangement set forth in claim 4 wherein said panel is of twin-sheet thermoform resin composition.

7. The arrangement set forth in claim 6 wherein said pair of pockets comprise a cylindrical passage extending laterally through said panel and means in said passage forming seats for said springs.

8. The arrangement set forth in claim 7 wherein passage comprises a tube insert molded into said panel.

9. The arrangement set forth in claim 1 wherein said foot has a pair of legs that extend outwardly of said panel at an angle to said panel for resilient compressive engagement with a bed floor.

10. The arrangement set forth in claim 9 wherein said at least one foot comprises a plurality of said feet spaced from each other between said side edges.

11. The arrangement set forth in claim 10 wherein said feet are removably mounted on said panel.

12. A bed partition arrangement for utility vehicles comprising:
- a pair of rails for mounting along opposed sidewalls of the vehicle bed, said rails having longitudinally spaced openings adapted to be disposed in laterally aligned pairs when said rails are mounted to the vehicle bed sidewalls,
- a flat panel of twin-sheet thermoform resin composition having laterally opposed side edges and a bottom edge,
- a pair of latches disposed at said side edges of said panel, each of said latches including a latch bar and means for moving said bar into locking engagement with an opposed opening in one of said rails, and
- means on said bottom edge for frictional engagement with the floor of the vehicle bed to restrain motion of said panel when said latches are in locking engagement with said rails,
- said latches comprising a pair of coaxial laterally outwardly opening pockets at respective ones of said side edges of said panel slidably receiving respective ones of said latch bars, a pair of coil springs disposed in respective ones of said pockets beneath said latch bars, and means for urging said latch bars into said pockets against said springs for alignment with an opening in one of said rails and then releasing said latch bar for engagement with the opening under force of said spring,
- said pair of pockets comprising a cylindrical passage extending laterally through said panel formed by a tube insert molded into said panel and means in said passage forming seats for said springs.

13. The arrangement set forth in claim 12 wherein said pockets comprise a pair of pins in said tube adjacent to and spaced from respective ends of said tube, said springs being seated against said pins.

14. The arrangement set forth in claim 12 wherein said means for frictional engagement with the bed floor comprises at least one foot of resilient elastomeric construction mounted at said bottom edge of said panel.

15. The arrangement set forth in claim 14 wherein said foot has a pair of legs that extend outwardly of said panel at an angle to said panel for resilient compressive engagement with a bed floor.

16. The arrangement set forth in claim 15 wherein said at least one foot comprises a plurality of said feet spaced from each other between said side edges.

17. The arrangement set forth in claim 16 wherein said feet are removably mounted on said panel.

18. The arrangement set forth in claim 12 wherein said urging means comprises a slot opening through said panel into each said pocket, and a handle coupled to each said bar and extending through the corresponding slot, said slot cooperating with said handle for limiting motion of the corresponding latch bar both into and out of the corresponding pocket.

* * * * *